United States Patent [11] 3,622,551

| | | |
|---|---|---|
| [72] | Inventor | Bernard J. Davis<br>Pass Christian, Miss. |
| [21] | Appl. No. | 877,526 |
| [22] | Filed | Nov. 17, 1969 |
| [45] | Patented | Nov. 23, 1971 |
| [73] | Assignee | Reichhold Chemicals, Inc.<br>White Plains, N.Y. |

[54] COPOLYMERS FROM PARA TERTIARY BUTYL STYRENE AND A DIOLEFIN AND METHOD FOR PRODUCING SAME
16 Claims, No Drawings

[52] U.S. Cl. .................................................. 260/84.1, 260/82.1, 260/83.7
[51] Int. Cl. ................................................ C08d 3/02, C08f 19/06
[50] Field of Search ........................................ 260/83.7, 84.1

[56] References Cited
UNITED STATES PATENTS

| | | | |
|---|---|---|---|
| 2,560,492 | 7/1951 | Sparks et al. .................. | 260/83.7 |
| 2,698,841 | 1/1955 | McKay ........................... | 260/45.5 |
| 3,048,562 | 8/1962 | Cult et al. ...................... | 260/45.5 |

*Primary Examiner*—Joseph L. Schofer
*Assistant Examiner*—Richard A. Gaither
*Attorneys*—Munson H. Lane and Munson H. Lane, Jr.

ABSTRACT: Copolymers are prepared from a diolefin and para tertiary butyl styrene in the presence of a Friedel-Crafts catalyst at 10°–90° C. The diolefin may be isoprene, piperylene and cyclopentadiene in a concentration ranging from about 95 percent to about 5 percent based upon the weight of the monomers. Resins thus produced are essentially colorless and have excellent color stability and show outstanding qualities when used in pressure sensitive adhesive systems.

COPOLYMERS FROM PARA TERTIARY BUTYL STYRENE AND A DIOLEFIN AND METHOD FOR PRODUCING SAME

The present application is related to the following applications of Bernard J. Davis: (1) Ser. No. 876,079, filed Nov. 12, 1969 entitled "Novel Modified Piperylene Resins and Method Therefor"; (2) Ser. No. 877,516, filed Nov. 17, 1969, entitled "Copolymers From Para Tertiary Butyl Styrene and Alpha Methyl Styrene and Method for Producing Same" (Case 2); and (3) Ser. No. 877,514, filed Nov. 17, 1969, entitled "Para Tertiary Butyl Styrene and Terpene Copolymer Resins and Method of Producing Same" (Case 3).

The invention relates to novel resinous copolymers comprising para tertiary butyl styrene and diolefins such as piperylene, isoprene, or cyclopentadiene or mixtures thereof and to the method of preparing the same. It has been found that a more useful product, particularly to the pressure-sensitive adhesive industry, is obtained by copolymerizing the said diolefins with para tertiary butyl styrene.

More particularly the invention relates to the preparation of copolymers from a diolefin and para tertiary butyl styrene in the presence of a Friedel-Crafts catalyst at 10°–90° C. The diolefin may be isoprene, piperylene and cyclopentadien in a concentration ranging from about 95 percent to about 5 percent based upon the weight of the monomers. Resins thus produced are essentially colorless and have excellent color stability and show outstanding qualities when used in pressure-sensitive adhesive systems.

The resins of this invention may be used to replace the terpene monomers normally employed in pressure-sensitive adhesive tape systems with greatly improved characteristics in tack, creep, and peel performance. (See test methods in Pressure Sensitive Tape Council, 5th Ed.) These resins resist oxidation and U.V. degradation to a greater degree than do the terpene based resins.

It has been found that the resins of this invention are equally as efficient in natural rubber composition pressure sensitive adhesive systems as in synthetic rubber systems, whereas the terpene resins are only effective in the respective natural rubber systems.

The resins of this invention also show increased advantages in compatibility, greater adhesion and chemical resistance in hot melt systems employing petroleum waxes or ethylene copolymers commonly employed in such systems or in mixtures of such wax and ethylene copolymer systems.

The diolefins employed may vary from pure isoprene of pure piperylene or pure cyclopentadiene to mixtures thereof (along with unreactive monoolefins) as obtained in concentrated streams as a byproduct in the steam cracking of hydrocarbons for the production of ethylene or propylene, or in a mixture as a byproduct of certain processes of making pure isoprene or butadiene.

The use of an olefin stream is preferred because of its commercial availability and relatively low cost as compared to the pure monomers. These streams consist generally of the following composition:

| | |
|---|---|
| Isoprene | 5–30% |
| Piperylene | 15–35% |
| Dicyclopentadiene | 0.5–20% |
| Monoolefins | 30–60% |
| Dimers | 3–10% |

In some cases, the streams as obtained from the steam cracking of hydrocarbons are so treated as to essentially remove all available isoprene or reduce it to a concentration of no more than 5 percent. In such cases, the resultant streams are higher in piperylene concentration. While cyclopentadiene may be used for the purpose of this invention, it is desirable to employ a stream whose cyclopentadiene concentration is less than 3 percent, because the presence of this monomer provides darker resins. Hence, a more typical piperylene concentrate stream from this source, suitable for use would have the following typical composition:

| | % BY WEIGHT |
|---|---|
| 3,3 Dimethyl butene-1 | 1.11 |
| trans pentene-2 | 5.85 |
| cis pentene-2 | 3.09 |
| 2-methyl butene-2 | 35.80 |
| 4-methyl pentene-1 and 2,3 dimethyl butene-1 | 2.68 |
| Isoprene | 3.29 |
| 2-methyl pentene-1 and cyclopentene | 2.24 |
| 2-methyl pentene-2 and cyclohexene | 0.09 |
| Piperylene | 36.30 |
| Cyclopentadiene | 0.84 |
| Piperylene dimers | 8.72 |

Another source for suitable piperylene concentrates is from the production of isoprene, as from propylene or isoamylene. Such streams are typically low in cyclopentadiene concentration and are generally richer in isoprene and piperylene. In any case, regardless of source, the piperylene is present in two isomeric forms at an apparently constant ratio of two parts trans-piperylene to one part cis-piperylene.

The typical composition of a piperylene-isoprene concentrate as available from this source is:

| | % BY WEIGHT |
|---|---|
| trans piperylene | 16.0 |
| cis piperylene | 8.1 |
| Isoprene | 25.3 |
| cyclopentadiene | 0.9 |
| cis 2 pentene | 0.2 |
| 2 methyl 2 butene | 46.1 |
| cyclopentene | 1.9 |
| dimers | 1.5 |

For the purpose of this invention in its broadest aspects either type of stream may be employed, and for convenience will here after be called the piperylene concentrate.

In employing either the piperylene concentrate the piperylene-isoprene concentrate, pure piperylene or pure isoprene, care should be taken in maintaining no more than 50 p.p.m. water maximum and peroxides levels of no more than 10 p.p.m.

To obtain best results, the para tertiary butyl styrene should be at least 99.0 percent pure though lower purities down to 80 percent may be employed and adjusted for the purpose of this invention.

As a general procedure for preparing a resin copolymer characteristic of this invention, the piperylene concentrate is premixed with the para tertiary butyl styrene. The mixture is dried over Linde 4A molecular sieve (Union Carbide, New York, New York) to remove water and then added to a cooled diluent containing the Friedel-Crafts catalyst at such a rate as to maintain the desired reaction temperature.

An organic reaction diluent is preferably, though not necessarily employed to alleviate the exothermal load of the reaction and may consist of an aromatic solvent such as benzene, toluene, xylene, or aromatic naphtha, an aliphatic solvent such as hexane, heptane, VM & P naphtha or mineral spirits, or mixtures thereof.

The Friedel-Crafts catalyst employed may be aluminum chloride, aluminum bromide, stannic chloride, alkyl tin chlorides, titanium tetra chloride, alkyl aluminum chlorides, boron trifluoride or its catalytic complexes, phosphorous penta fluoride or its catalytic complexes or any Friedel-Crafts catalyst or mixtures thereof with or without cocatalysts. The concentration of catalysts may vary with the catalyst employed. For example, when using aluminum chloride from about 1 to about 5 percent may be employed based on the weight of monomers while from about 1 to 2 percent is preferred. When using boron trifluoride from about one-fourth to about 2 percent can be employed with from about one-half to about 1 percent being preferred.

The temperature of the reaction may range from about 10° to about 90° C., but ideally should range between about 20° to about 30° C. to obtain optimum color and yield.

When all the monomer has been added, the reaction mixture is held at the reaction temperature for an additional hour, at which time the reaction is essentially complete.

The reaction mass is then treated to neutralize and remove the catalyst by any method well known to the art and the mixture filtered to provide a clear resin solution suitable for distillation.

The resin solution is then inert gas sparged to a temperature of about 220° C. then steam distilled to a temperature of about 235° C. It is maintained at about 235° C. with steam distilling until the condensate coming over has a water to oil ratio of about 9.9 to about 0.1. The resin is then poured.

Suitable antioxidants, synergists and other additives may also be included in small proportions to improve the reaction as is well known to those skilled in the art, but these are not essential to the process in its broadest aspects.

A more detailed procedure is given below as is typical of that employed in the examples shown.

TYPICAL EXAMPLE

To a 5-liter flask equipped with stirrer, thermometer, inert gas sparge tube, reflux condenser and addition funnel was added 2,732 grams of dry heptane and 70.9 grams anydrous aluminum chloride. The system was previously evacuated of moisture and air with dry nitrogen and a nitrogen atmosphere was maintained throughout the reaction period. The reaction flask was immersed in a cold glycol bath maintained at 0° to −5° C. and a previously dried mixture of 1,575 grams para tertiary butyl styrene and 3,150 grams of piperylene concentrate containing 40 percent piperylene, 9 percent dimers and 51 percent monoolefins was slowly added over a period of 1 hour and 45 minutes maintaining a reaction temperature of 20°–25° C.

At the end of the addition period, the reaction mass was maintained at 25° C. with a tap water bath for an additional 1 hour and 15 minutes.

Neutralization was accomplished by adding 178 grams hydrated lime followed by 28.4 grams water. This mixture was then heated to 90° C. and 178 grams attapulgus clay was added. The reaction mass was then heated to 105°–110° C. and held at this temperature for one-half hour. During this period all water of neutralization was distilled off.

The mixture was then filtered. 4.7 grams triphenyl phosphite was then added to the filtrate and the mixture inert gas sparged to 220° C. At this point gas sparge was charged to steam and the mixture was steam distilled to 235° C. and continued at that temperature until a condensate of 99 percent water and 1 percent oil was obtained. Steam was then discontinued, 1.7 grams Irganox 1010 antioxidant and 0.85 grams dilauryl thiodipropionate synergist (American Cyanamid) were added and the mixture stirred 15 minutes under nitrogen.

Irganox 1010 is a commercially known antioxidant of Geigy Chemical Corporation, Yonkers, New York, having the following chemical and physical properties:

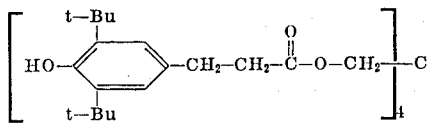

Other antioxidants may be used, if desired, in place of or together with Irganox 1010. Such antioxidants are known to the art and referred to in Reinhold's "The Condensed Chemical Dictionary," 6th Edition, pages 97 and 98.

As shown in the examples below, the concentration of para tertiary butyl styrene may range from about 5 percent to about 95 percent of the monomer mix to provide resins typical of this invention, though for practicality a range from about 30 percent to about 50 percent is most desirable.

Table I gives the results obtained from examples I through XVI. The resins produced in examples I through XVI are typical of this invention and were obtained by using various percentages of diolefins and para tertiary butyl styrene as indicated. The method used for the resin preparation was as previously described under the heading "Typical Example," supra.

TABLE 1

| Example No. | Diolefin employed | Percent diolefin by weight | Percent press by weight | Type catalyst | Yield, percent | Color, Gardner | Ring and ball melt point, °C. | Percent catalyst |
|---|---|---|---|---|---|---|---|---|
| 1 | Piperylene conc. | 100 |  | AlCl₃ | 64.5 | 3 | 100 | 1.5 |
| 2 | do | 90 | 10 | Same | 66 | 3 | 98 | 1.5 |
| 3 | do | 80 | 20 | do | 68 | 3 | 97 | 1.5 |
| 4 | do | 70 | 30 | do | 70 | 2½ | 98 | 1.5 |
| 5 | do | 60 | 40 | do | 75 | 2 | 100 | 1.5 |
| 6 | do | 50 | 50 | do | 78 | 2 | 105 | 1.5 |
| 7 | do | 40 | 60 | do | 81 | 1½ | 111 | 1.5 |
| 8 | do | 30 | 70 | do | 83 | 1 | 122 | 1.5 |
| 9 | do | 20 | 80 | do | 87 | <1 | 132 | 1.5 |
| 10 | do | 10 | 90 | do | 90 | <1 | 141 | 1.5 |
| 11 | do |  | 100 | do | 8 | W.W. | 153 | 1.5 |
| 12 | do | 66 | 33 | do | 72.7 | 2½ | 100 | 1.5 |
| 13 | Isoprene | 50 | 50 | do | 100 | <1 | 70 | 1.5 |
| 14 | Piperylene | 50 | 50 | do | 100 | <1 | 83 | 1.5 |
| 15 | Piperylene conc. | 66 | 33 | BF₃ | 70 | 2 | 101 | 0.5 |
| 16 | do | 66 | 33 | PF₅ | 72 | 2 | 103 | 0.3 |

EXAMPLE XVII

To demonstrate the efficiency of a resin typical of this invention when employed in a standard pressure sensitive tape system, the resin produced in example XII was compounded in such systems and results compared to a pure terpene commercial resin having a 15° C. higher melting point.

The formulas employed were:

NATURAL RUBBER

| | |
|---|---|
| Light Crepe No. 1 | 100.00 |
| Plastanox 2246 (American Cyanamid) | 1.00 |
| Resin XII or Terpene | 90.00 |
| Toluol | 90.00 |
| Hexane | 360.00 |

SYNTHETIC RUBBER

| | |
|---|---|
| SBR 1011 | 100.00 |
| Plastanox 2246 (American Cyanamid) | 1.00 |
| Resin XII or Terpene | 90.00 |
| Toluol | 90.00 |
| Hexane | 360.00 |

The cements were prepared by milling the rubber on a 6 inch by 13 inch rubber mill for 11½ minutes, the antioxidant added during this cycle with the rolls kept close and cool. The rubber was then dissolved in the solvent mix with the resin on a ball mill.

The resultant adhesive was coated onto a suitable substrate for pressure sensitive adhesive testing. For our purposes, we wet coated (0.025 inch) onto Endura M1–218A (3) "masking tape" grade paper (Dewey & Almy Chem. Div., W.R. Grace & Co., Cambridge, Mass.).

The tapes were then exposed to ultraviolet light, at a distance of 24 inches (Westinghouse Sun Lamp 275 W) for 10 and 15 hours and then tested for peel, creep, tack and "quick-stick" (See Test methods in Pressure Sensitive Tape Council, 5th Ed.). These tests were again conducted on tape samples which had been in an air-circulating oven at 158° F. for 7 and 14 days. A control was also run in both cases.

The results from example XVII are shown in table II on the following page.

TABLE II

|  | Resin XII | | Terpene | |
| --- | --- | --- | --- | --- |
|  | Natural rubber | SBR (1011) | Natural rubber | SBR (1011) |
| Control: | | | | |
| Peel (grams 1 in.) | 1,850 | 2,500 | 1,600 | Failed, no readings. |
| Creep (minutes) | 50 | 98 | 29 | Do. |
| Tack (inches) | 0.5 | 0.8 | 0.8 | Do. |
| 10 hours U.V.: | | | | |
| Peel (grams 1 in.) | 2,000 | 2,500 | 1,750 | Failed. |
| Creep (minutes) | 120+ | 120+ | 110 | Do. |
| Tack (inches) | 0.5 | 1.0 | 0.9 | Do. |
| 15 hours U.V.: | | | | |
| Peel (grams 1 in.) | 2,100 | 2,450 | 1,800 | Do. |
| Creep (minutes) | 120+ | 120+ | 100 | Do. |
| Tack (inches) | 0.5 | 1.1 | 1.2 | Do. |
| 7 days at 158° F.: | | | | |
| Peel (grams 1 in.) | 1,900 | 2,600 | 1,550 | Do. |
| Creep (minutes) | 30 | 60 | 12 | Do. |
| Tack (inches) | 0.6 | 0.8 | (¹) | Do. |
| 14 days at 158° F.: | | | | |
| Peel (grams 1 in.) | 1,900 | 2,600 | 1,500 | Do. |
| Creep (minutes) | 30 | 60 | 8 | Do. |
| Tack (inches) | 0.8 | 1.0 | (¹) | Do. |
| Quick stick | 1,200 | 1,000 | 1,075 | No reading. |

¹ Over 6" (fail).

What is claimed is:

1. A method of producing resinous copolymers suitable for use in pressure-sensitive adhesive systems, which method comprises reacting (A) para tertiary butyl styrene and (B) a diolefin which is a member of a group consisting of isoprene, piperylene, cyclopentadiene and mixtures thereof in the presence of a Friedel-Crafts catalyst at a temperature ranging from about 10° to about 90° C. and recovering said resinous copolymers.

2. The method of producing resinous copolymers according to claim 1 wherein the reaction is run in an inert organic solvent.

3. The method of producing resinous copolymers according to claim 2 wherein the inert solvent is a member of the group consisting of benzene, toluene, xylene, aromatic naphtha, hexane, heptane, naphtha and mineral spirits and mixtures thereof.

4. The method of producing resinous copolymers according to claim 2 wherein the inert solvent is heptane.

5. The resinous copolymer according to claim 16 wherein (B) is isoprene.

6. The resinous copolymer according to claim 16 wherein (B) is piperylene.

7. The resinous copolymer according to claim 16 wherein (B) is cyclopentadiene.

8. The method of producing resinous copolymers according to claim 1 wherein the Friedel-Crafts catalyst is a member of a group consisting of aluminum chloride, aluminum bromide, stannic chloride, alkyl tin chlorides, titanium tetra chloride, alkyl aluminum chloride, boron trifluoride, phosphorous penta fluoride and mixtures thereof.

9. The method of producing resinous copolymers according to claim 8 wherein the Friedel-Crafts catalyst is aluminum chloride.

10. The method of producing resinous copolymers according to claim 8 wherein the level of the Friedel-Crafts catalyst ranges from about 0.25 percent to about 5 percent.

11. The method of producing resinous copolymers according to claim 9 wherein the level of the Friedel-Crafts catalyst is about 1.5 percent.

12. The resinous copolymer according to claim 16 wherein the level of (A) ranges from about 5 to about 95 percent based upon the weight of the monomers.

13. The resinous copolymer according to claim 16 wherein the level of (B) ranges from about 95 to about 5 percent based upon the weight of the monomers.

14. The method of producing resinous copolymers according to claim 1 wherein the temperature ranges from about 20° to about 25° C.

15. The method of producing resinous copolymers according to claim 1 wherein said resinous copolymer is recovered by neutralization and distillation.

16. A resinous copolymer suitable for use in pressure sensitive adhesive systems by reacting (A) paratertiary butyl styrene and (B) a diolefin which is a member of a group consisting of isoprene, piperylene, cyclopentadiene and mixtures thereof in the presence of a Friedel-Crafts catalyst at a temperature ranging from about 10° to about 90° C. and recovering said copolymers; said copolymers being essentially colorless and having excellent color stability.

* * * * *